United States Patent
Guichard et al.

(10) Patent No.: US 7,936,668 B2
(45) Date of Patent: May 3, 2011

(54) METHODS AND APPARATUS FOR DISTRIBUTING LABEL INFORMATION

(75) Inventors: James N. Guichard, Groton, MA (US); Matthew H. Birkner, Apex, NC (US); Robert H. Thomas, Lexington, MA (US); Roy M. Brooks, New Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 887 days.

(21) Appl. No.: 11/138,052

(22) Filed: May 26, 2005

(65) Prior Publication Data

US 2006/0268853 A1 Nov. 30, 2006

(51) Int. Cl.
*G01R 31/08* (2006.01)
*H04L 12/28* (2006.01)
*H04L 12/66* (2006.01)

(52) U.S. Cl. ........ 370/229; 370/355; 370/356; 370/389; 370/395.31

(58) Field of Classification Search ............ 370/389
See application file for complete search history.

(56) References Cited

U.S. PATENT DOCUMENTS

| | | | |
|---|---|---|---|
| 6,374,303 B1* | 4/2002 | Armitage et al. | 709/242 |
| 6,483,833 B1* | 11/2002 | Jagannath et al. | 370/392 |
| 2003/0107992 A1* | 6/2003 | Garcia-Luna-Aceves et al. | 370/230 |
| 2004/0114595 A1* | 6/2004 | Doukai | 370/389 |
| 2005/0083936 A1* | 4/2005 | Ma | 370/392 |
| 2005/0235134 A1* | 10/2005 | O'Sullivan | 712/10 |
| 2005/0259649 A1* | 11/2005 | Smith | 370/389 |
| 2007/0127502 A1* | 6/2007 | Zhu | 370/397 |

OTHER PUBLICATIONS

Andersson, et al., RFC 3036- "LDP Specification", available on Jun. 18, 2009, at http://www.ietf.org/rfc/rfc3036.txt, 124 pgs.

* cited by examiner

*Primary Examiner* — Daniel J Ryman
*Assistant Examiner* — John Blanton
(74) *Attorney, Agent, or Firm* — Brinks Hofer Gilson & Lione

(57) ABSTRACT

A given router in the core of a label-switching network identifies a group of routers to receive common label binding information for later routing packets along respective paths through the label-switching network. One way to identify which of multiple routers to include as a member of the group to receive the same label information is to analyze egress policies associated with downstream routers in the label-switching network. Based on this analysis, the given router identifies group members as routers having a substantially same egress policy as each other. The given router then allocates memory resources to store a common set of label information to be distributed to each member in the group of routers having the same egress policy. After populating the memory resources with label information, the given router distributes a common set of label information to each router in the group of routers.

20 Claims, 5 Drawing Sheets

METHODS AND APPARATUS FOR DISTRIBUTING LABEL INFORMATION

BACKGROUND

As well known, the Internet is a massive network of networks in which computers communicate with each other via use of different communication protocols. The Internet includes packet-routing devices, such as switches, routers and the like, interconnecting many computers. To support routing of information such as packets, each of the packet-routing devices typically maintains routing tables to perform routing decisions in which to forward traffic from a source computer, through the network, to a destination computer.

One way of forwarding information in a provider network over the Internet is based on MPLS (Multiprotocol Label Switching) techniques. In an MPLS-network, incoming packets are assigned a label by a so-called LER (Label Edge Router) receiving the incoming packets. The packets in the MPLS network are forwarded along a predefined Label Switch Path (LSP) defined in the MPLS network based, at least initially, on the label provided by a respective LER. At internal nodes of the MPLS-network, the packets are forwarded along a predefined LSP through so-called Label Switch Routers.

Each Label Switch Router (LSR) in an LSP between respective LERs in an MPLS-type network makes forwarding decisions based solely on a label of a corresponding packet. Depending on the circumstances, a packet may need to travel through many LSRs along a respective path between LERs of the MPLS-network. As a packet travels through an label-switching network, each LSR along an LSP strips off an existing label associated with a given packet and applies a new label to the given packet prior to forwarding to the next LSR in the LSP. The new label informs the next router in the path how to further forward the packet to a downstream node in the MPLS network eventually to a downstream LER that can properly forward the packet to a destination.

As discussed above, LERs assign incoming packets entering the MPLS-network a label (identifier). Once classification of an incoming packet is complete and mapped in the MPLS-network, other incoming packets are assigned to the appropriate Labeled Switch Paths (LSPs).

Generating LSPs and forwarding packets based on labels serves a number of purposes. For example, LSPs might guarantee a certain quality of service level of performance for a series of data packets. LSPs also provide operators the flexibility to route packets around network congested regions or downed network nodes as well as to create IP tunnels for network-based virtual private networks.

Each LSR in an MPLS-network maintains a so-called Label Forwarding Information Base (LFIB) that identifies how to forward received packets according to their corresponding labels. LFIBs are populated based on use of a protocol known as LDP (Label Distribution Protocol). In general, LDP is a downstream label allocation technique that works in the following way: For each route or path (e.g., Label Switching Path or LSP) in a respective routing table, the label switch router (LSR) allocates a label and creates an entry in its Label Forwarding Information Base (LFIB) with the incoming label set to the allocated label. The LSR then advertises the binding between the label (incoming) it created and a respective route to other adjacent label switch routers. When a LSR receives label binding information for a route and such information was originated by the next hop for that route, the respective LSR places the label into the outgoing label of the LFIB entry associated with the route. This results in creation of a binding between the outgoing label and the route.

LDP associates a Forwarding Equivalence Class (FEC) with each LSP it creates. The FEC associated with an LSP specifies which packets are mapped to the given LSP. LSPs extend through the MPLS-network as each successive LSR splices incoming labels for an FEC to an outgoing label assigned to be the next hop for the given FEC.

Currently, each LSR in an MPLS-network allocates a separate memory block for storing and transferring label binding information to each of its downstream neighbors. For example, a given LSR allocates a block of memory for each downstream neighbor in which to store and thereafter send label binding information to respective peers.

SUMMARY

Conventional techniques of distributing label binding information can suffer from a number of deficiencies. For example, conventional LDP techniques can become inefficient as an MPLS network grows to include hundreds or even thousands of edge routers. In such a circumstance, a given LSR in the MPLS-network might have upwards of 150 or more neighbors or LDP peers in which to forward label binding information. During a conventional distribution process, a given LSR allocates a separate block of memory for each of the LDP peers to which it will send label binding information. The label binding information for each peer can occupy upwards of one or more megabytes of memory (e.g., DRAM) for temporary storage purposes. Consequently, in this circumstance, the given LSR must allocate upwards of 150 megabytes of memory for storing label binding information (e.g., 4000 or more 32 bit labels) to be distributed to respective peers in the MPLS network. Each LSR in the MPLS network, therefore, must be able to at least temporarily allocate many large blocks of memory resources to support distribution of information based on LDP, especially as a core MPLS network grows.

Another deficiency associated with conventional techniques of distributing label information is the time it takes for configuring elements (e.g., routers) in the label-switching network to create LSPs. This is known as convergence time. Preferably, the convergence time is on the order of several minutes or less for a larger sized network. A requirement to configure or reconfigure a network, as the case may be, can occur more often in larger networks because there are more routers to possibly fail, experience congestion, or simply need rebooting during operation. Unfortunately, conventional label information distribution techniques could require an hour or more to distribute labels throughout a label-switching network having several thousands of edge routers and thousands of routes and label bindings. Accordingly, distribution of label information requires considerable processor time and can result in memory fragmentation, potentially rendering an MPLS router node at least temporarily useless for routing packets from an ingress node to an egress node.

In contradistinction to the techniques discussed above as well as additional techniques known in the prior art, embodiments discussed herein include novel techniques for distributing label information in a label-switching network.

For example, according to one embodiment during convergence of the label-switching network, a given router in the core of a label-switching network identifies a group of routers that will receive common label binding information for later routing packets along respective paths through the label-switching network. One way to identify which of multiple downstream routers to include as members of the group is to analyze egress policies associated with downstream routers in the label-switching network. Based on such an analysis, the given router identifies members of the group as downstream routers having a substantially same egress policy as each other. The given router in the label-switching network then allocates memory resources such as a block or fragments of memory to store a common set of label information to be distributed to each member (e.g., a downstream LSR) in the group of routers having the same egress policy. After populating the local memory resources with label information, the given router distributes a common set of label information as stored in the local memory resources to each router in the group of downstream routers.

In furtherance of the above embodiment, a router in a label-switching network can identify multiple groupings of routers in which each router in a respective group of routers receives common label information. For example, the given router as discussed above can further identify a second group of routers in the label-switching network that are to receive the same set of label information for configuring paths of the label-switching network to carry packets through the label-switching network. In such an instance, for the second group of routers, the given router then allocates a second set of memory resources for the second group of routers and populates the second set of memory resources with a second set of label information. During the convergence mode, the given router distributes the second set of label information stored in the second set of memory resources to each router in the second group of routers.

Accordingly, a router in the core of the label-switching network can reduce how much memory resources are consumed during distribution (e.g., according to LDP) of label information during network convergence when routers in the label-switching network communicate amongst each other to set up paths. For example, instead of allocating a separate set of memory resources for each neighbor to which label information must be sent, the router analyzes which of the neighbor routers in the label-switching network have common egress filtering LDP configurations (e.g., common egress policies) in order to allocate a set of memory resources for storing label information for a set of routers in a respective group as identified above.

Note that techniques herein are well suited for use in applications such as distributing labels in a label-switching network. However, it should be noted that configurations herein are not limited to use in such applications and thus configurations herein and deviations thereof are well suited for other applications as well.

Other examples of the present application include a computerized device (e.g., a data communication device) configured to support the aforementioned method operations disclosed herein as embodiments of the present application to facilitate distribution of labels in a label-switching network. In such embodiments, the computerized device includes a memory system, a processor (e.g., a processing device), and an interconnect. The interconnect supports communications among the processor, and the memory system. The memory system is encoded with an application that, when executed on the processor, produces a process to distribute the label information to other routers in a core of a label-switching network.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to distribute a common set of label information to multiple LSRs in the label-switching network as explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One particular embodiment of the present application is directed to a computer program product that includes a computer readable medium having instructions stored thereon for supporting distribution of label information. The instructions, when carried out by a processor of a respective computer device, cause the processor to perform the steps of: i) identifying a group of routers in a label-switching network to receive common label information for routing packets along multiple respective paths through the label-switching network; ii) for the group of routers, allocating memory resources; iii) populating the memory resources with a set of label information; and iv) distributing the set of label information stored in the memory resources to each router in the group of routers. Other embodiments of the present application include software programs to perform any of the method embodiment steps and operations summarized above and disclosed in detail below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One embodiment herein is directed to a technique of facilitating distribution of label information (e.g., label-binding information) in a label-switching network environment such as one in which core routers of the label-switching network forward or switch data packets based on corresponding labels rather than layer 2 and/or layer 3 header information embedded in the switch data packets.

According to such an embodiment, during convergence (e.g., configuration) of the label-switching network, a given router in the core of a label-switching network distributes common label binding information to a group of routers. As discussed, the label binding information helps to define at least part of a label-switching path, which is used for later switching packets along respective paths through the label-switching network.

One way to identify which of multiple routers in a core label-switching network to include as a member of a particular group receiving the common set of label binding information is to analyze egress policies associated with downstream routers in the label-switching network. For example, based on such an analysis, a given router in a label-switching network identifies members of the group as routers having a substantially same egress policy as each other. The given router then allocates and utilizes memory resources such as a block of memory to store a common set of label information eventually distributed to each member in the group of routers having the same egress policy.

Figure 1:
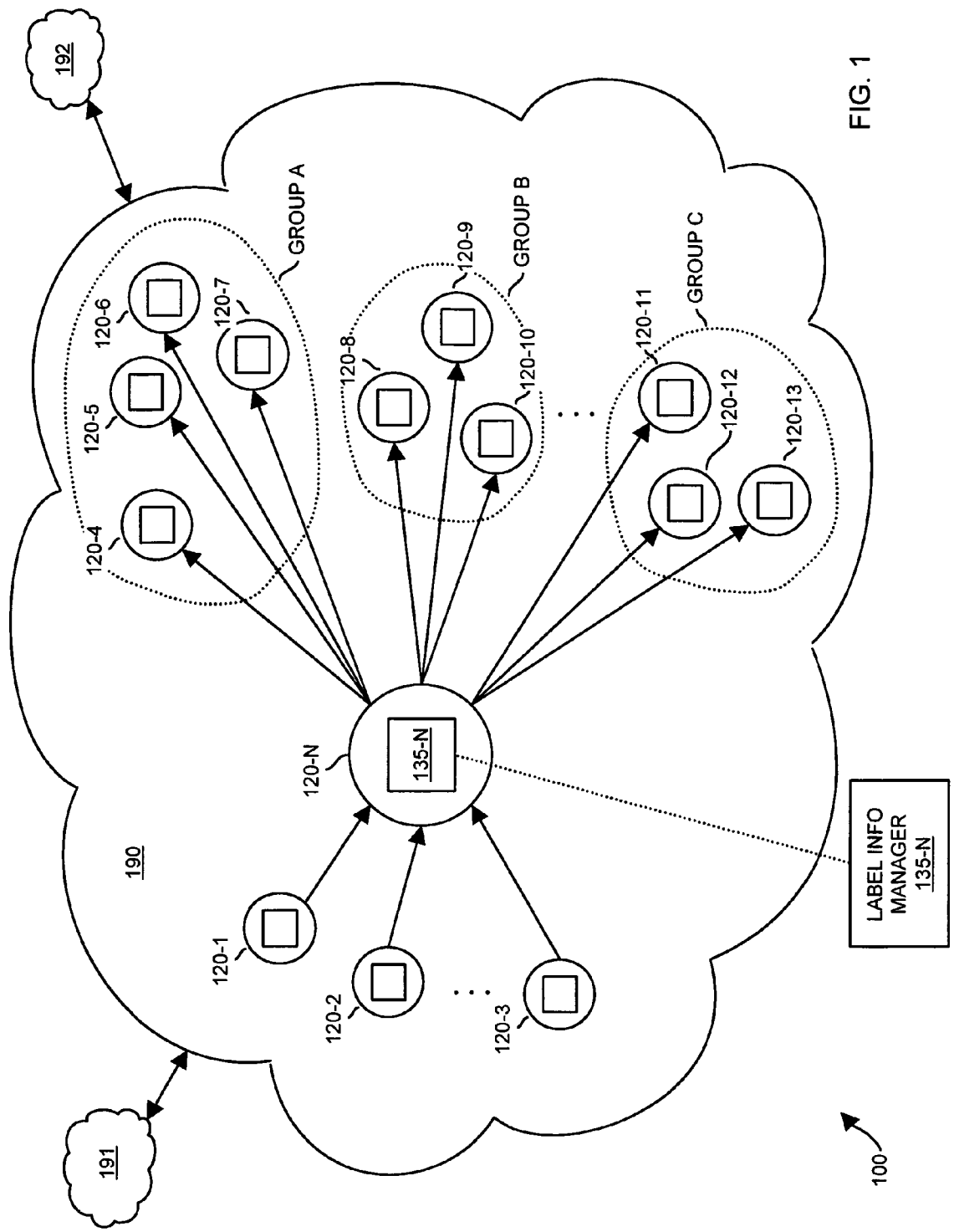
FIG. 1 is a diagram of a communication system in which data communication devices such as routers distribute label information amongst each other according to an embodiment herein.

FIG. 1 is a block diagram of a communication system 100 in which data communication devices 120 such as routers distribute label information. As shown, communication system 100 includes network 190 (e.g., a label-switching network such as that based on MPLS techniques). Network 190 includes data communication devices 120 (e.g., data communication device 120-1, data communication device 120-2, data communication device 120-3 . . . , data communication device 120-13, and data communication device 120-N). Each data communication device 120 includes a respective label information manager 135 to manage label information. Respective label information managers 135 perform such functions as creating forwarding tables based on received label information and generating sets of label information for distribution to downstream data communication devices 120 in network 190.

Communication system 100 can include additional networks such as network 191 and network 192. These latter mentioned networks may or may not convey data packets via label-switching techniques.

According to one embodiment, data communication devices 120 in network 190 communicate amongst each other via a number of different protocols. For example, data communication devices 120 communicate via TCP/IP (Transmission Control Protocol/Internet Protocol) communication sessions in network 190. One purpose of communicating is to disseminate label information defining routing paths (e.g., label-switching paths) between edge routers in network 190 based on LDP. The data communication devices 120 also communicate amongst each other to learn and/or teach which router nodes in network 190 are part of a label-switching path between respective ingress and egress edge routers in network 190.

In one embodiment, a control component of network 190 consists of IP routing protocols (typically OSPF or Intermediate System-to-Intermediate System [IS-IS]) running in conjunction with MPLS (Multi-Protocol Label Switching) label allocation and maintenance procedures. The control component is responsible for setting up label forwarding paths along paths or IP routes in network 190. The control component also maintains accuracy for the paths, given topology changes that might occur.

The OSPF or IS-IS routing protocol can run in a normal way, automatically creating forwarding tables in each data communication device 120. The MPLS Label Distribution Protocol (LDP) works in a way that is linked to the routing protocols, and works in parallel with them. For example, based on the routing information provided by OSPF or IS-IS, LDP exchanges the labels needed by the forwarding function. In a packet environment, LDP is used in a downstream label-allocation scheme, which works in the following manner: For each route in its routing table, the label switch router (LSR or data communication device 120) allocates a label and creates an entry in its Label Forwarding Information Base (LFIB) with the incoming label set to the allocated label. The LSR then advertises the binding between the label (incoming label) it created and the route to other adjacent label switch routers. When a LSR receives label binding information for a route and such information was originated by the next hop for that route, the switch places the label into the outgoing label of the LFIB (Label Forwarding Information Base) entry associated with the route. This creates the binding between the outgoing label and the route.

During operation such as after configuration of data communication devices 120 in network 120, forwarding of data packets is based on a notion of label swapping. For example, when a LSR such as router hardware (for example, a Cisco™ 7200 or 12000 series router) receives a packet with a label, the label is used as an index in a respective LFIB (e.g., forwarding table). Each entry in the LFIB consists of an incoming label and one or more subentries of the form (outgoing label, outgoing interface, outgoing link-level information). For each subentry, the LSR receiving the data packet replaces the incoming label with the outgoing label and sends the packet over the outgoing interface with the corresponding link-level information to the next hop in a routing path.

Since data packets are routed in network 190 via label-switching techniques, the data communication devices 120 in network 190 are configured to support forwarding of data packets via respective labels attached to the data packets when entering network 190 as discussed in the previous paragraphs. During a configuration phase, the data communication devices 120 in network 190 communicate with each other to learn of an existence of their respective adjacent neighbors such as downstream neighbors in network 190. In one embodiment, based on adjacencies or next hop neighbors, the data communication devices 120 utilize LDP (Label Distribution Protocol) to distribute label information and thus define label-switching paths from ingress edge routers of network 190 to egress edge routers of network 190. Typically, a given data communication device 120 at a core (e.g., not an edge router) of network 190 receives label information from one or more upstream data communication devices 120. Via a respective label information manager, the core data communication device 120 uses this received information to generate a forwarding table (e.g., LFIB) for later transmission of "labeled" data packets through network 190. Additionally, the core data communication device 120 generates label information for distribution to other nodes in network 190. According to one embodiment, the core data communication device 120 generates at least one set of label binding information for transmission to multiple downstream nodes.

More specifically, in the embodiment shown in FIG. 1, data communication device 120-N identifies groupings of downstream nodes in network 190 to receive a common set of label-binding information. For example, group A includes data communication devices 120-4, 120-5, 120-6 and 120-7. Group B includes data communication devices 120-8, 120-9, and 120-10. Group C includes data communication devices 120-11, 120-12, and 120-13. When distributing label information such as label-binding information, label information manager 135-N in respective data communication device 120-N transmits a same set of label information to each member of a respective group of downstream data communication devices 120.

According to an embodiment as mentioned, one way to identify which of multiple routers in a core label-switching network to include as a member of a group is to analyze egress policies associated with the downstream routers in the label-switching network. For example, based on such an analysis, label information manager 135-N in data communication device 120-N identifies members of the group as routers having a substantially same egress policy as each other. The label information manager 135-N allocates and utilizes memory resources such as a block of memory to store a common set of label information to be distributed to each member in the group of routers having the same or similar egress policy.

Figure 2:
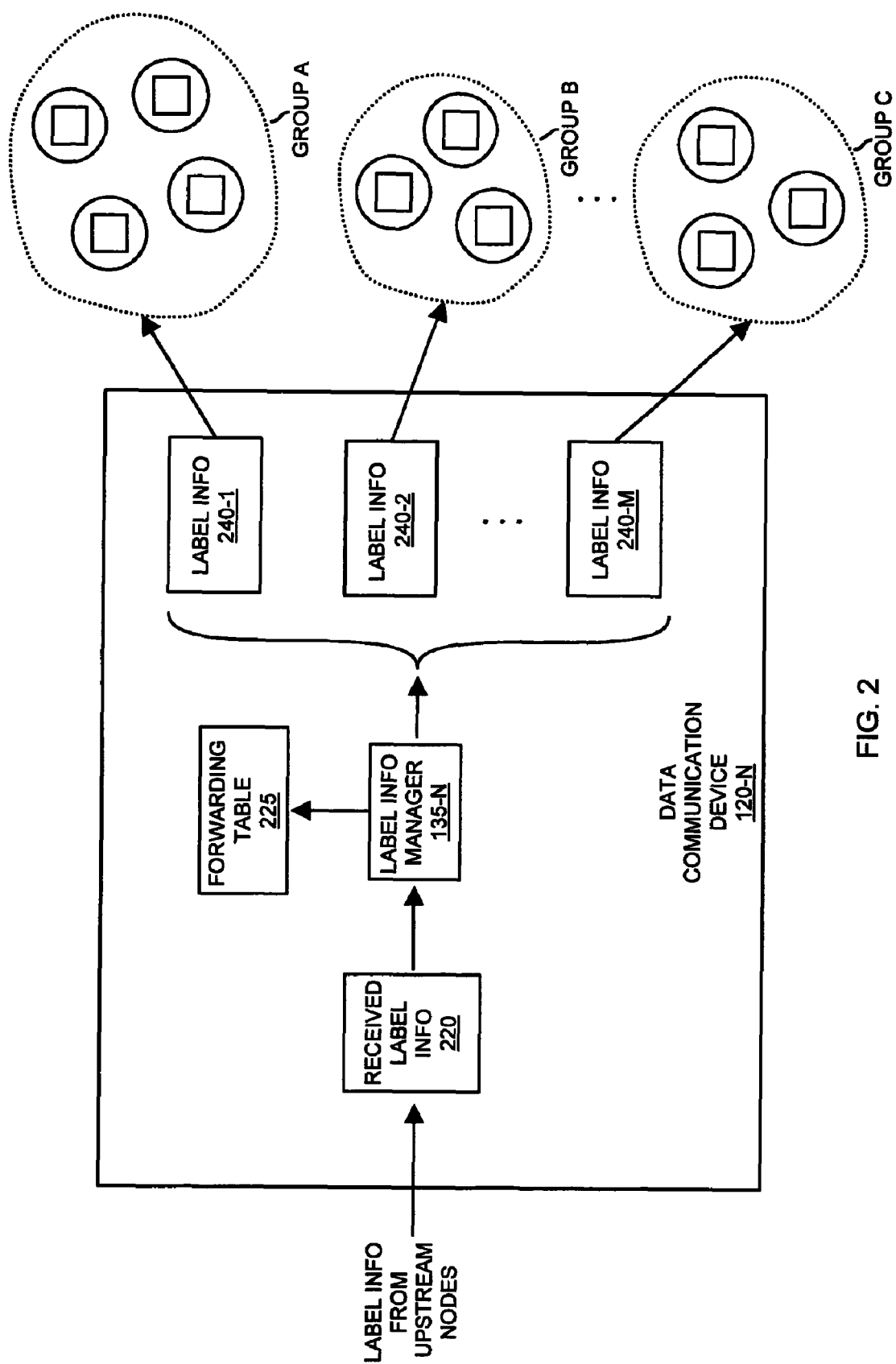
FIG. 2 is a block diagram of a label information manager that forwards common label information to members in a respective group according to an embodiment herein.

FIG. 2 is a block diagram more particularly illustrating a technique of configuring data communication devices 120 according to an embodiment herein. As shown, data communication device 120-N includes received label information 220, label information manager 135-N, label information 240-1, label information 240-2, . . . , and label information 240-3.

In general, data communication device 120-N receives label information from upstream nodes in network 190. Based on received label information 220, label information manager 135-N creates forwarding table 225 for transmission of data packets based on label-switching techniques. Based on contents of forwarding table 225 and received label information 220, label information manager 135-N generates sets of label information 240 for distribution to respective groups of data communication devices 120.

According to one embodiment, during convergence of the label-switching network 190, data communication device 120-N operating in the core of a label-switching network identifies groups of routers (e.g., other data communication devices 120) to receive common label binding information (e.g., how a label changes at hops along a respective label-switching path) for later routing packets along respective paths through the label-switching network. As mentioned, one way to identify which of multiple downstream data communication devices 120 to include as members of the group is to analyze egress policies associated with downstream data communication devices in the label-switching network 190. Based on an analysis, data communication device 120-N identifies members of, for example, group A as downstream routers having a substantially same egress policy as each other.

For a given group of data communication devices, data communication device 120-N allocates memory resources such as a block or fragments of memory to store a common set of label information to be distributed to each member (e.g., a downstream LSR) in the group of routers having the same egress policy. After populating the local memory resources with respective label information such as label information 240-1, label information 240-2, and label information 240-M, data communication device 120-N distributes a respective common set of label information as stored in the local memory resources to each router in the group of downstream routers in a configuration mode. That is, data communication device 120-N distributes label information 240-1 to each member of group A. Data communication device 120-N distributes label information 240-2 to each data communication device member of group B, and so on. A transfer of the label information to target data communication device in network 190 can be achieved via use of a traditional TCP stack.

Accordingly, a data communication device 120-N in the core of network 190 can reduce how much memory resources are consumed during distribution (e.g., according to LDP) of label information during network convergence when routers in the label-switching network communicate amongst each other to set up paths through the label-switching network based on label binding information. For example, instead of allocating a separate set of memory resources for each neighbor to which label information must be sent, data communication device 120-N analyzes which of the neighbor routers in network 190 have common egress filtering LDP configurations (e.g., common egress policies) in order to allocate a set of memory resources for storing label information for a set of routers in a respective group as identified above.

Additionally, the above technique reduces how much time it takes to distribute label information 240 during a network configuration mode. For example, typical large-scale label-switching networks can include several thousands of provider edge routers. In such a circumstance, a given LSR in an MPLS-network can have upwards of 150 or more neighbors or LDP peers in which to forward label binding information. In these circumstances, sending a common set of label information to each of multiple data communication devices in a network enables the network to "converge" in a shorter period of time. That is, the data communication devices 120 can communicate amongst themselves to configure a label-switching network on the order of several minutes rather than an hour. A requirement to configure or reconfigure a network, as the case may be, can occur more often in larger networks because there are more routers to possibly fail, experience congestion, or simply need rebooting during operation. Thus, the need to reduce convergence time in these larger networks becomes more compelling.

In addition to reducing a requirement of transient memory resources required to store label information 240, techniques herein enable distribution of label information based on considerably less processor time as compared to that required by conventional techniques. Along a similar vein, techniques herein also reduce memory fragmentation, which potentially could render an MPLS router node at least temporarily useless for routing data packets.

Figure 3:
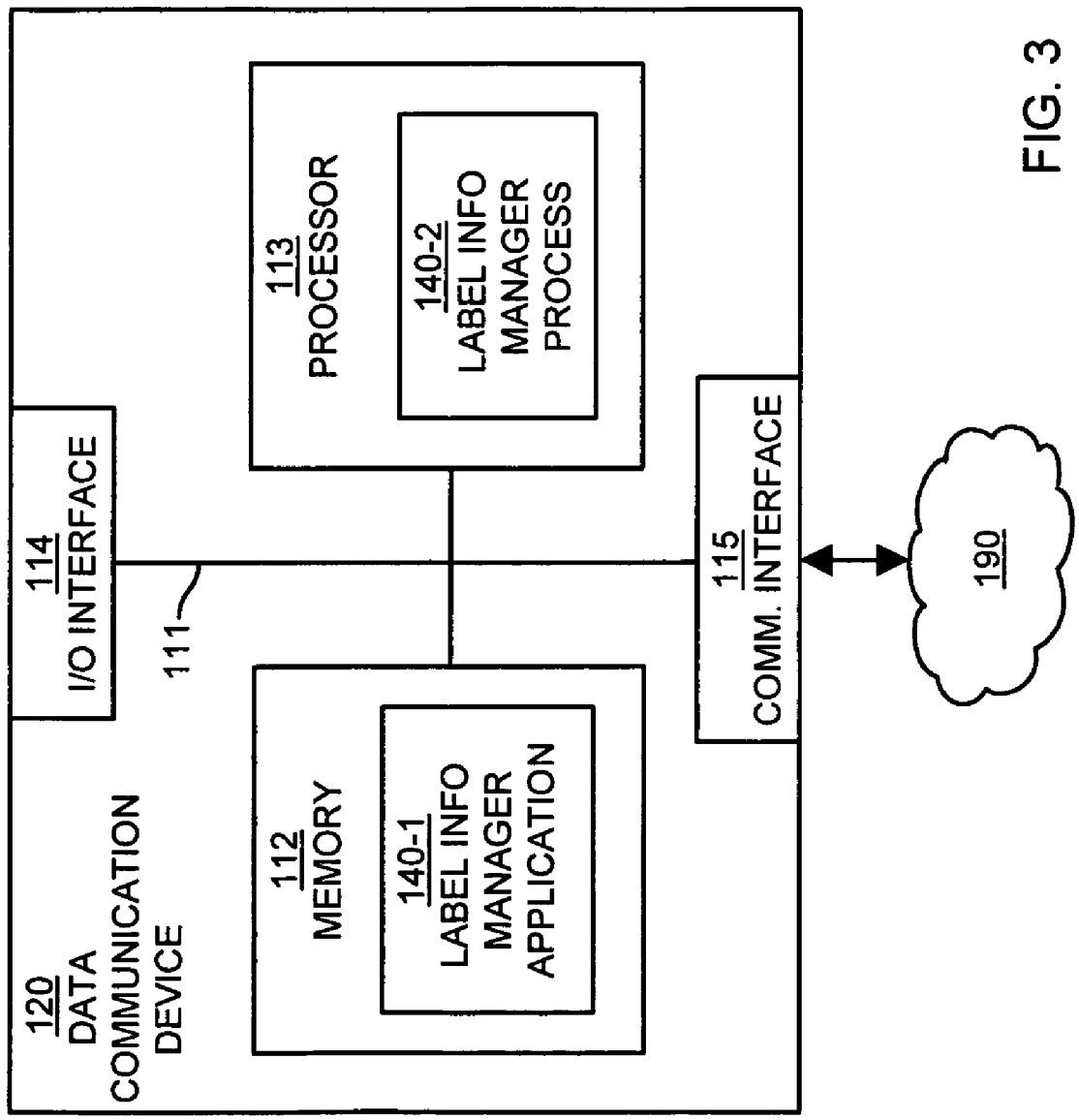
FIG. 3 is a block diagram of a processing device suitable for executing an label information manager according to an embodiment herein.

FIG. 3 is a block diagram illustrating an example architecture of a data communication device 120 for executing a label information manager application 140-1 according to embodiments herein. Data communication device 120 may be a computerized device such as a personal computer, workstation, portable computing device, console, network terminal, processing device, router, server, etc. As shown, data communication device 120 of the present example includes an interconnect 111 that couples a memory system 112, a processor 113, I/O interface 114, and a communications interface 115. I/O interface 114 potentially provides connectivity to peripheral devices such as a keyboard, mouse, display screens, etc.

Communications interface 115 enables data communication device 120 to communicate over network 190 to other data communication devices in communication system 100.

As shown, memory system 112 is encoded with a label information manager application 140-1 (e.g., label information manager 135-N) supporting management of label information as discussed above. Label information manager application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the agent application 140-1. Execution of the label information manager application 140-1 produces processing functionality in label information manager process 140-2. In other words, the label information manager process 140-2 represents one or more portions of the label information manager application 140-1 (or the entire application) performing within or upon the processor 113 in the data communication device 120.

It should be noted that a label information manager 135 executed in a data communication device 120 (as in FIG. 1) can be represented by either one or both of the label information manager application 140-1 and/or the label information manager process 140-2. For purposes of the discussion of the operation of embodiments of the present application, general reference will be made to the data communication device 120-N or respective label information manager 135-N as performing or supporting the various steps and functional operations to carry out the features of embodiments herein.

It also should be noted that, in addition to the label information manager process 140-2, embodiments herein include the label information manager application 140-1 itself (i.e., the un-executed or non-performing logic instructions and/or data). The label information manager application 140-1 may be stored on a computer readable medium such as a floppy disk, hard disk or in an optical medium. The label information manager application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of label information manager application 140-1 in processor 113 as the label information manager process 140-2. Thus, those skilled in the art will understand that the data communication device 120 (e.g., computer system) may include other processes and/or software and hardware components, such as an operating system that controls allocation and use of hardware resources.

Functionality supported by data communication device 120 and, more particularly, label information manager 135-N will now be discussed via flowcharts in FIG. 4-5. For purposes of this discussion, data communication device 120-N or label information manager 135-N generally performs steps in the flowcharts. This functionality can be extended to the other entities as well.

Note that there will be some overlap with respect to concepts discussed above for FIGS. 1 and 2. Also, note that the steps in the below flowcharts need not always be executed in the order shown.

Figure 4:
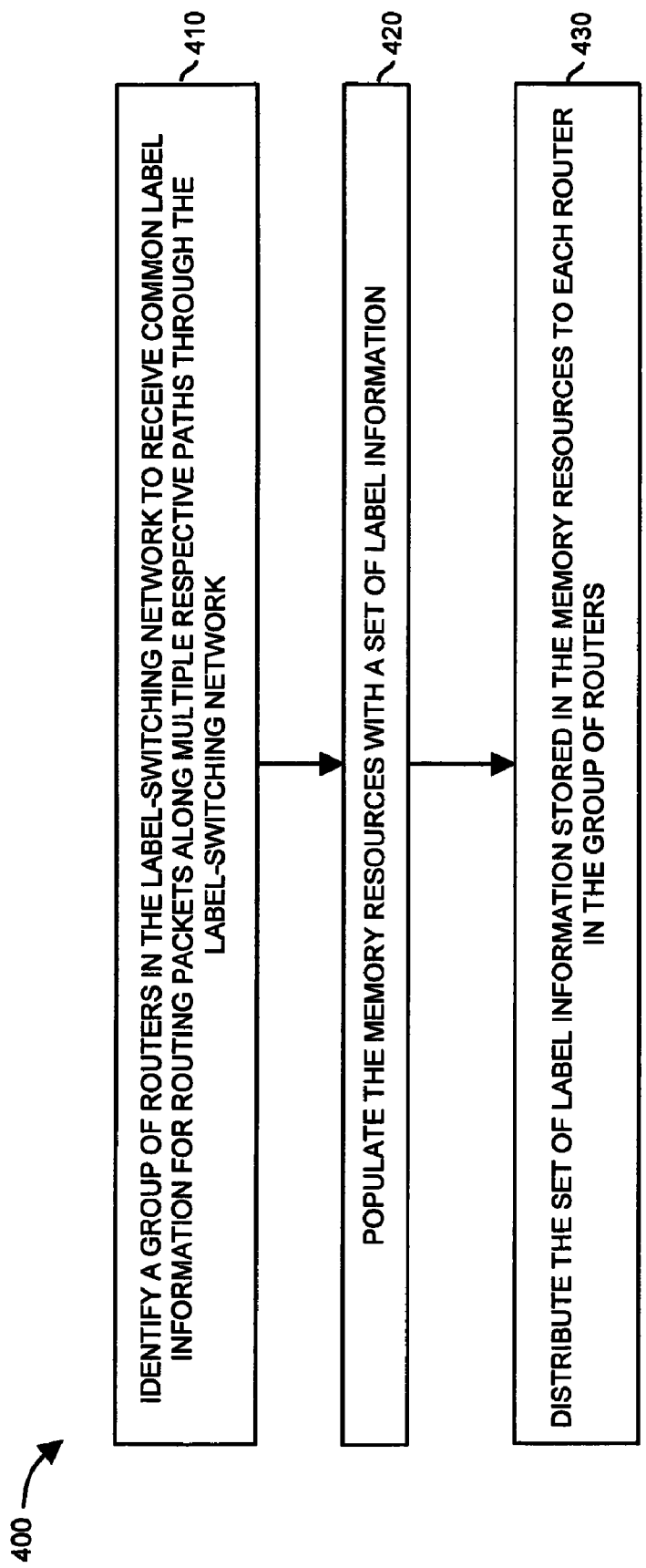
FIG. 4 is a flowchart illustrating a technique for distributing label information according to an embodiment herein.

FIG. 4 is a flowchart 400 illustrating a technique of distributing label information 240 throughout communication system 100 as discussed above. As discussed, one purpose of distributing label information in this manner is to reduce system convergence time so that network 190 (including thousands of router nodes) can be configured on the order of minutes rather than hours.

In step 410, data communication device 120-N identifies a group of routers in the label-switching network to receive common label information for routing packets along multiple respective paths through the label-switching network.

In step 420, data communication device 120-N populates the memory resources with a set of label information.

In step 430, data communication device 120-N distributes the set of label information stored in the memory resources to each router in the group of routers.

Note that although the above discussion pertains to a specific data communication device (e.g., router node in label-switching network) such as data communication device 120-N, each of the data communication devices 120 in the core of network 190 can operate in a similar way to initiate further distribution of label information amongst each other.

Figure 5:
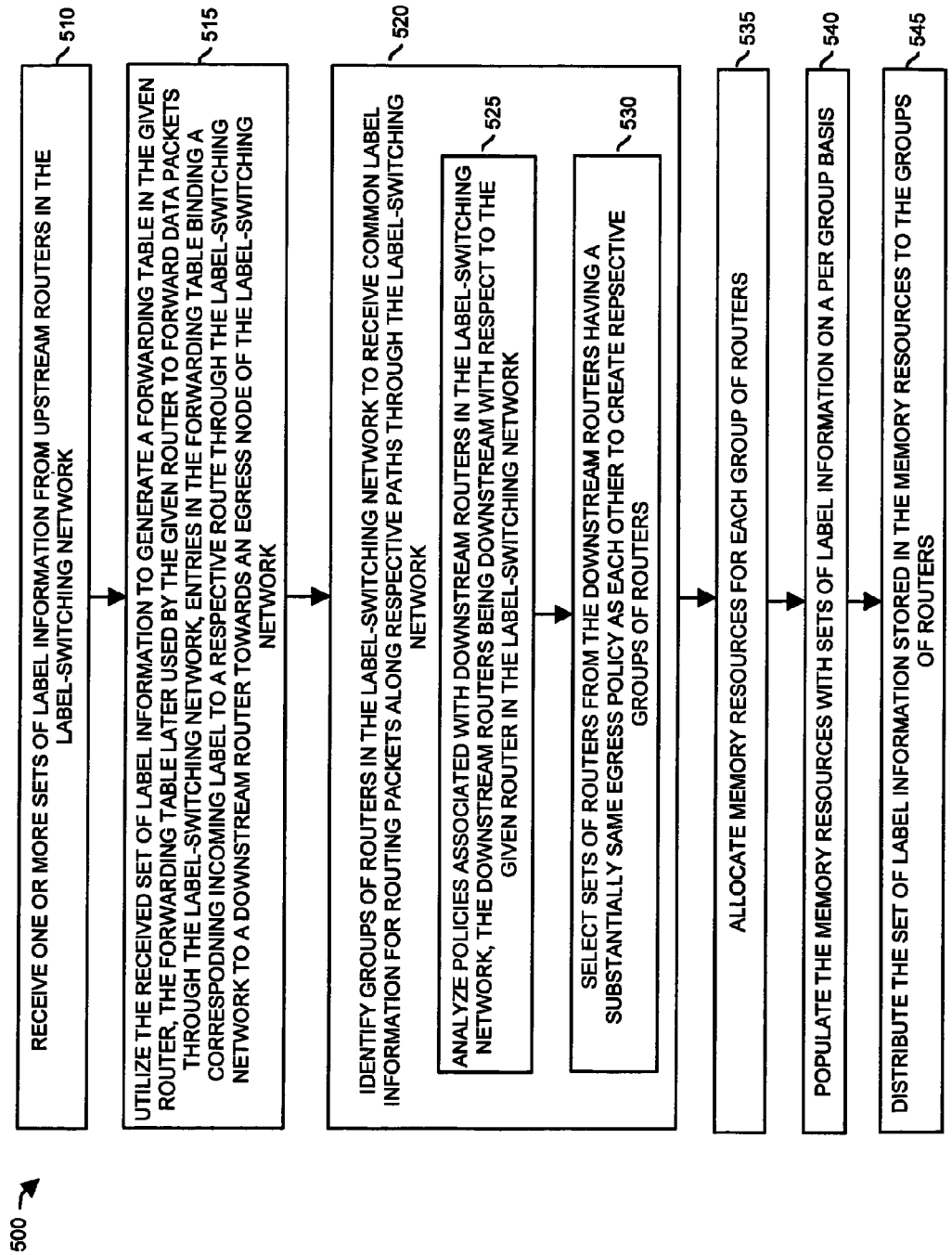
FIG. 5 is a flowchart illustrating a more specific technique of distributing label information according to an embodiment herein.

FIG. 5 is a flowchart 500 illustrating a more specific techniques associated with embodiments herein.

In step 510, data communication device 120-N receives one or more sets of label information from upstream routers such as data communication device 120-1, data communication device 120-2, and data communication device 120-3 in the label-switching network 190.

In step 515, data communication device 120-N utilizes the received set of label information to generate a forwarding table. The forwarding table identifies how data communication device 120-N swaps labels and forwards data packets through the label-switching network 190. Entries in the forwarding table bind a corresponding incoming label to a respective route through the label-switching network to a downstream router towards an egress node of the label-switching network 190.

In step 520, data communication device 120-N identifies groups of routers (e.g., data communication devices) in the label-switching network 190 to receive common label information.

In sub-step 525 associated with step 525, data communication device 120-N analyzes policies associated with downstream routers in the label-switching network 190.

In sub-step 530 associated with step 525, data communication device 120-N selects sets of routers from the downstream data communication devices 120 having a substantially same egress policy as each other to create respective groups of data communication devices.

In step 535, data communication device 120-N allocates memory resources for each identified group of data communication devices.

In step 540, data communication device 120-N populates the memory resources with sets of label information on a per group basis.

In step 545, data communication device 120-N distributes the set of label information stored in the memory resources to the groups of data communication devices.

Note again that techniques herein are well suited for use in applications such as distributing labels in a label-switching network. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a given router of a label-switching network having a plurality of other routers, a method for distributing label binding information to other routers in the label-switching network, the method comprising:

identifying a group of routers from the plurality of other routers in the label-switching network to receive same label information for routing packets along multiple respective paths through the label-switching network, wherein the group of routers is less than the plurality of other routers in the label-switching network, wherein each router in the group of routers is adjacent the given router, and wherein the group of routers is less than all routers adjacent the given router;

allocating memory resources associated with the group of routers;

populating the memory resources with a single entry containing the same label information; and distributing the same label information from the single entry stored in the memory resources to each router in the group of routers.

2. A method as in claim 1, wherein identifying the group of routers in the label-switching network includes:

analyzing policies associated with the group of routers in the label-switching network, the group of routers being downstream with respect to the given router in the label-switching network; and identifying a set of routers from the group of routers, wherein each router in the set of routers has a substantially same egress policy as each other; and wherein distributing the same label information includes:

transmitting the same label information to each router in the identified set of routers.

3. A method as in claim 2, wherein transmitting the same label information includes:

transmitting LDP binding information to each router in the identified set of routers.

4. A method as in claim 1, wherein the group of routers is a first group of routers and the same label information is a first set of same label information, the method further comprising:

identifying a second group of routers in the label-switching network to receive a second set of same label information for routing packets along the multiple respective paths through the label-switching network;

allocating a second set of memory resources associated with the second group of routers;

populating the second set of memory resources with a second single entry containing the second set of same label information; and distributing the second set of same label information stored in the second single entry of the second set of memory resources to each router in the second group of routers.

5. A method as in claim 4, wherein identifying the group of routers includes:

defining the first group of routers in the label-switching network to be a set of peer routers that have a common egress filtering LDP (Label Distribution Protocol) configuration.

6. A method as in claim 5, wherein distributing the label information includes:

distributing the same label information to the first group of routers according to LDP (Label Distribution Protocol).

7. A method as in claim 1, wherein steps of identifying, allocating, populating, and distributing occur during convergence of the label-switching network in which routers in the label-switching network communicate amongst each other to create respective forwarding tables establishing the multiple paths through the label-switching network.

8. A method as in claim 1 further comprising:

receiving a set of label information from an upstream router in the label-switching network;

utilizing the received set of label information to generate a forwarding table in the given router, the forwarding table later used by the given router to forward data pockets through the label-switching network in which an entry in the forwarding table binds an incoming label to a respective route through the label-switching network to a downstream router towards an egress node of the label-switching network; and wherein populating the memory resources includes, populating the memory resources with the set of label information based at least in part on the received set of label information from the upstream router and label binding information in the forwarding table.

9. A label-switching network having a plurality of routers, the label-switching network comprising:

a first router;

a plurality of downstream routers with respect to the first router; and the first router supporting operations of:

identifying a group of routers from the plurality of downstream routers in the label-switching network to receive same label information for routing packets along multiple respective paths through the label-switching network, wherein the group of routers is less than the plurality of downstream routers, wherein each router in the group of routers is adjacent the first router, and wherein the group of routers is less than all routers adjacent the given router;

allocating memory resources associated with the group of routers;

populating the memory resources with a single entry containing the same label information; and distributing the same label information from the single entry stored in the memory resources to each router in the group of routers.

10. A label-switching network as in claim 9, wherein identifying the group of routers in the label-switching network includes:

analyzing policies associated with the group of routers in the label-switching network, the group of routers being downstream with respect to the first router in the label-switching network; and identifying a set of routers from the group of routers, wherein each router in the set of routers has a substantially same egress policy as each other; and wherein distributing the same label information includes:

transmitting the same label information to each router in the identified set of routers over respective communication sessions between the first router and each router in the selected set of routers.

11. A label-switching network as in claim 10 further comprising:

at least one upstream router;

the first router further supporting operations of:

receiving a set of label information from the at least one upstream router in the label-switching network;

utilizing the received set of label information to generate a forwarding table in the first router, the forwarding table later used by the first router to forward data packets through the label-switching network later convergence of the network, entries in the forwarding table binding incoming labels to respective routes through the label-switching network to a downstream router towards an egress node of the label-switching network; and wherein populating the memory resources includes, populating the memory resources with the set of label information based at least in part on the received set of label information from the upstream router and label binding information in the forwarding table.

12. A computer system for distributing label information in a label-switching network, the computer system comprising:

a processor;

a memory unit that stores instructions associated with an application executed by the processor; and an interconnect coupling the processor and the memory unit, enabling the computer system to execute the application and perform operations of:

identifying a group of routers from a plurality of routers in the label-switching network to receive same label information for routing packets along multiple respective paths through the label-switching network, wherein the group of routers is less than the plurality of routers in the label-switching network, wherein each router in the group of routers is adjacent a given router, and wherein the group of routers is less than all routers adjacent the given router;

for the group of routers, allocating memory resources;

populating the memory resources with a single entry containing the same label information; and distributing the same label information from the single entry stored in the memory resources to each router in the group of routers.

13. A computer system as in claim 12, wherein identifying the group of routers in the label-switching network includes:

analyzing policies associated with the group of routers in the label-switching network, the group of routers being downstream with respect to the given router in the label-switching network;

identifying a set of routers from the group of routers, wherein each router in the set of routers has a substantially same egress policy as each other; and wherein distributing the same label information includes:

transmitting the same label information to each router in the identified set of routers.

14. A computer system as in claim 13, wherein transmitting the same label information includes transmitting LDP binding information to each router in the identified group of routers.

15. A computer system as in claim 12, wherein the group of routers is a first group of routers and the same label information is a first set of same label information, the method further comprising:

identifying a second group of routers in the label-switching network to receive a second set of same label information for routing packets along the multiple respective paths through the label-switching network;

allocating a second set of memory resources associated with the second group of routers;

populating the second set of memory resources with a second single entry containing a second set of same label information; and distributing the second set of same label information stored in the second single entry of the second set of memory resources to each router in the second group of routers.

16. A computer system as in claim 12, wherein identifying the group of routers includes:

defining the first group of routers in the label-switching network to be a set of peer routers that have a common egress filtering LDP (Label Distribution Protocol) configuration.

17. A computer system as in claim 12, wherein distributing the label information includes:

distributing the same label information to the first group of routers according to LDP (Label Distribution Protocol).

18. A computer system as in claim 12, wherein steps of identifying, allocating, populating, and distributing occur during convergence of the label-switching network in which routers in the label-switching network communicate amongst each other to create respective forwarding tables establishing the multiple paths through the label-switching network.

19. A computer system as in claim 12 that additionally performs operations of:

receiving a set of label information from an upstream router in the label-switching network;

utilizing the received set of label information to generate a forwarding table in the given router, the forwarding table later used by the given router to forward data packets through the label-switching network in which an entry in the forwarding table binds an incoming label to a respective route through the label-switching network to a downstream router towards an egress node of the label-switching network; and wherein populating the memory resources includes, populating the memory resources with the set of label information based at least in part on the received set of label information from the upstream router and label binding information in the forwarding table.

20. A computer system for tracking an ability to convey messages over a network, the computer system including:

means identifying a group of routers from the plurality of other routers in the label-switching network to receive same label information for routing packets along multiple respective paths through the label-switching network, wherein the group of routers is less than the plurality of other routers in the label-switching network, wherein each router in the group of routers is adjacent a given router, and wherein the group of routers is less than all routers adjacent the given router;

means for allocating memory resources associated with the group of routers;

means for populating the memory resources with a single entry containing the same label information; and means for distributing the same label information from the single entry stored in the memory resources to each router in the group of routers.

\* \* \* \* \*